(12) United States Patent
Maffre

(10) Patent No.: US 7,766,574 B2
(45) Date of Patent: Aug. 3, 2010

(54) FASTENER SYSTEM FOR FASTENING TOGETHER PARTS USING PINS HAVING COLLARS

(75) Inventor: Jean-Philippe Maffre, Dammarie les Lys (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/107,854

(22) Filed: Apr. 18, 2005

(65) Prior Publication Data

US 2005/0238423 A1    Oct. 27, 2005

(30) Foreign Application Priority Data

Apr. 23, 2004    (FR)    .................. 04 04313

(51) Int. Cl.
*F01D 5/06* (2006.01)
*F01D 25/24* (2006.01)

(52) U.S. Cl. ............ 403/337; 403/22; 403/408.1; 411/389

(58) Field of Classification Search ........... 403/21, 403/22, 337, 408.1; 411/388, 389, 966; 285/412, 285/413; 416/215, 94, 245 R
See application file for complete search history.

(56) References Cited

U.S. PATENT DOCUMENTS

| 2,525,217 A | * | 10/1950 | Glitsch | 411/389 |
| 2,738,126 A | * | 3/1956 | Edwards | 416/215 |
| 3,371,644 A | * | 3/1968 | Yost | |
| 3,739,451 A | * | 6/1973 | Jacobson | 403/337 |
| 4,190,397 A | | 2/1980 | Schilling et al. | |
| 4,729,707 A | * | 3/1988 | Takahashi | 411/389 |
| 4,747,750 A | * | 5/1988 | Chlus et al. | 415/173.7 |
| 4,786,201 A | * | 11/1988 | Huetter et al. | 411/389 |
| 4,844,694 A | | 7/1989 | Naudet | |
| 5,211,541 A | * | 5/1993 | Fledderjohn et al. | 416/198 A |
| 5,215,335 A | | 6/1993 | Hamm, Jr. | |
| 5,226,788 A | | 7/1993 | Fledderjohn | |
| 6,641,326 B2 | * | 11/2003 | Schilling et al. | 403/337 |
| 6,887,043 B2 | * | 5/2005 | Dix et al. | 416/94 |

FOREIGN PATENT DOCUMENTS

| DE | 3924829 A1 | * | 2/1991 |
| DE | 196 27 386 A1 | | 1/1997 |
| FR | 2367943 A | * | 6/1978 |

OTHER PUBLICATIONS

Drawing—Portion of the fastener discussed in the "Background of the Invention."

* cited by examiner

*Primary Examiner*—Daniel P Stodola
*Assistant Examiner*—Ernesto Garcia
(74) *Attorney, Agent, or Firm*—Oblon, Spivak, McClelland, Maier & Neustadt, L.L.P.

(57) ABSTRACT

A fastener system is configured to fasten together at least two parts, one of which includes at least one flange that is caused to bear against a surface of the other part by a plurality of pins each presenting a collar having a non-circular outline. The collar is received in a groove formed in a bearing surface of one of the parts, and is designed to prevent the pins from turning by abutment against a wall, wherein the outline of each collar includes two substantially opposite plane surfaces that serve as mutual abutments against two adjacent collars.

9 Claims, 2 Drawing Sheets

FASTENER SYSTEM FOR FASTENING TOGETHER PARTS USING PINS HAVING COLLARS

FIELD OF THE INVENTION

The invention relates to a fastener system for fastening together at least two annular parts using a plurality of pins having collars that prevent said pins from turning.

The invention applies in particular to turbine rotors including upstream and downstream flanges which are themselves connected to wiper sealing rings, but it can apply to connecting any two parts together via flanges.

BACKGROUND OF THE INVENTION

The pins are metal rods serving to assemble together two parts, and having ends that are threaded. Said pins are normally fastened via one of their ends in one of the parts, pass through the second part, and receive a clamping nut at the other end.

In aviation, the pins normally pass through both parts and receive a clamping nut at each end. In turbine rotors, the clamping nuts are difficult to access, and it is sometimes necessary to assemble and securely fasten the pins on one of the parts before assembling the other part. Such pins enable modular assemblies to be prepared, which make maintenance operations easier.

In such circumstances, each pin presents a middle collar having a non-circular outline, which collar is received in a groove formed in the bearing surface of one of the two parts, and, while the nut is being tightened on said part, comes to bear against an axial wall defining the groove. Thus, all the pins are initially fastened on said first part, and it only remains to put the second part into position and tighten the second set of clamping nuts.

The periphery of each collar is shaped to present flats which come to bear against a wall of the first part while the first nuts are being tightened, thereby preventing the pins from turning. There is thus the risk of damaging the first part, which is an expensive structural part, whereas the pin is inexpensive and disposable. This risk occurs during the initial assembly of the turbine, and also during subsequent maintenance operations requiring the rotor to be removed.

Furthermore, the groove in which the collars are implanted is wide, thereby leading to very significant flexibility, that is damaging to the dynamic behavior of the assembly.

OBJECT AND SUMMARY OF THE INVENTION

The object of the invention is to mitigate those drawbacks and to propose a new fastener system using pins having collars that prevent said pins from turning, and in which the collars are shaped so as not to bear against the parts that are to be assembled together.

The invention thus relates to a fastener system for fastening together at least two parts, one of which includes at least one flange that is caused to bear against a surface of the other part by means of a plurality of pins, such a pin comprising two threaded ends and presenting a middle collar having a non-circular outline, said collar being received in a groove formed in a bearing surface of one of said parts, and being designed to prevent said pins from turning.

In the invention, the outline of each collar includes two substantially opposite plane surfaces that serve as mutual abutments against the collars of the adjacent pins.

When the two parts are substantially circularly symmetrical about an axis, and the bearing surfaces are perpendicular to said axis, the plane surfaces of the collars extend in planes containing said axis.

The system applies in particular when one of the parts is a turbine wheel and the other part is a flange.

BRIEF DESCRIPTION OF THE DRAWINGS

Other advantages and characteristics of the invention will appear on reading the following description given by way of example, and with reference to the accompanying drawings, in which.

MORE DETAILED DESCRIPTION

Figure 2:
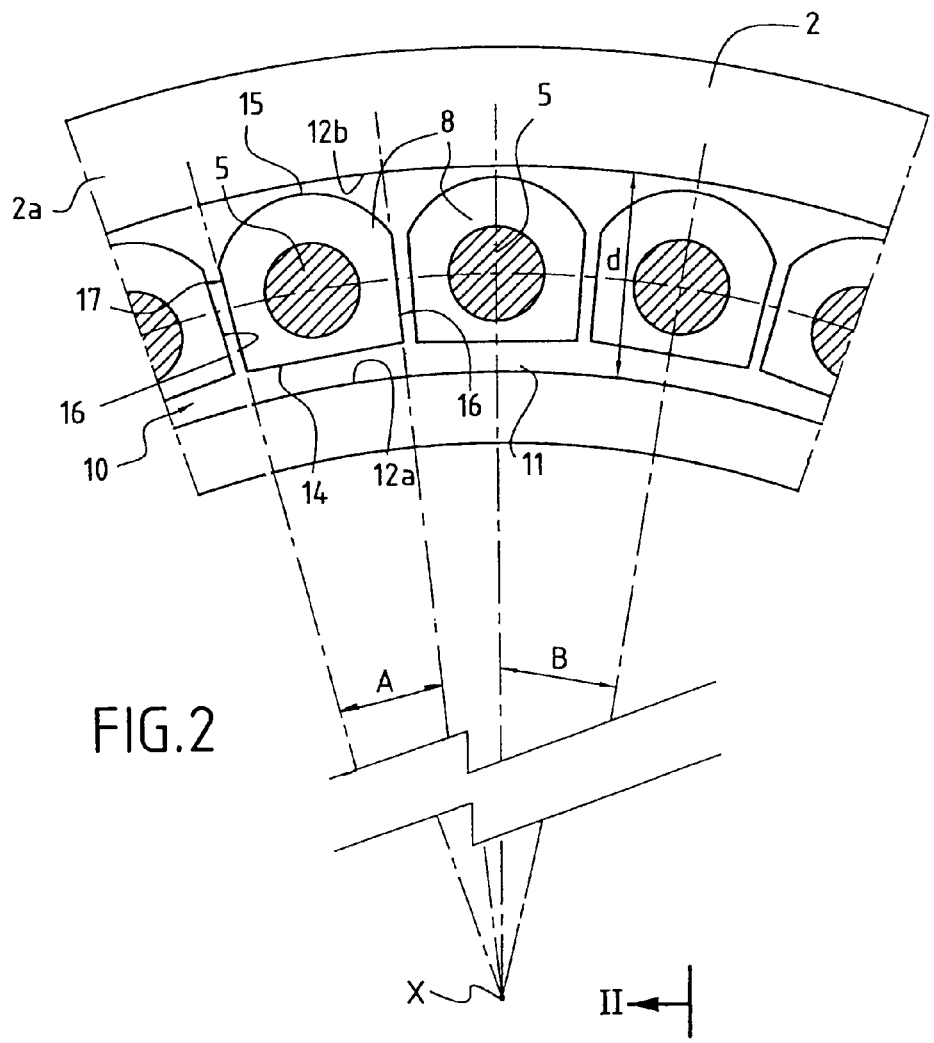
FIG. 2 is a front view of the part containing the groove receiving the collars of the pins.
Figure 1:
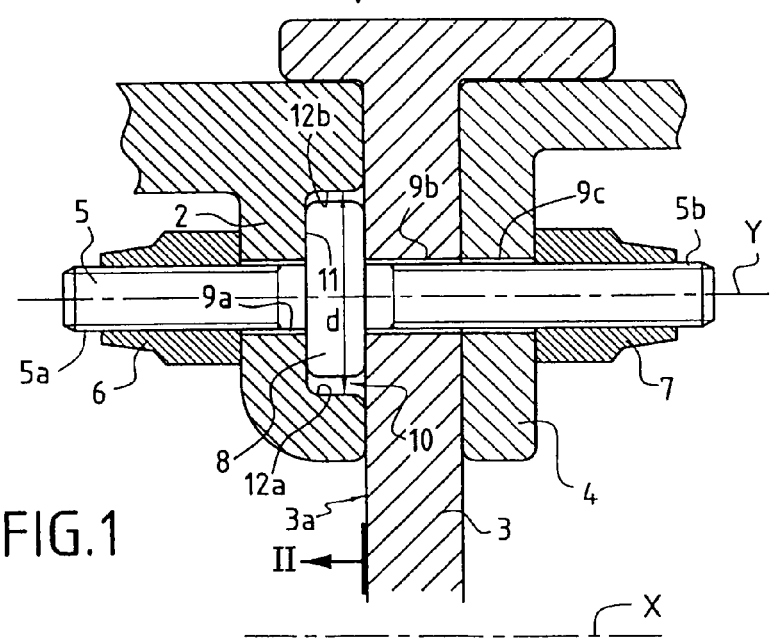
FIG. 1 is a section view showing three circularly symmetrical parts being fastened together by a fastener system of the invention, this section being on a plane containing the axis of symmetry and the axis of a pin.

FIGS. 1 and 2 show the fastener system for fastening together three parts that are substantially circularly symmetrical about an axis X, and that can be a flange 2 of a turbine wheel, a flange 3 of a support bearing, and a flange 4 carrying a labyrinth sealing device, for example. The system is constituted by a plurality of pins 5 having ends 5a and 5b that are threaded so as to receive clamping nuts 6 and 7, and that present respective collars 8 in their middle zones. The pins 5 are evenly distributed about the axis X and pass through holes 9a, 9b, and 9c formed in the parts 2, 3, and 4 respectively, and put into register with one another.

Once the pins have been put into place and tightened, the axes Y of the pins 5 are parallel to the axis X. The bearing surfaces of the parts 2, 3, and 4 are parallel to one another and extend in planes perpendicular to the axis X.

In the example shown in FIGS. 1 and 2, the part 2 presents, in its face 2a that bears against the face 3a of the part 3, an annular groove 10 for receiving the collars 5 of the pins 5. The groove 10 presents a U-shaped section in a radial plane containing the axis X, and is defined by a bottom wall 11 perpendicular to the axis X, and by two cylindrical walls 12a and 12b of axis X and radially spaced apart by a distance $\underline{d}$. The holes 9a open out in the bottom wall 11 substantially half way between the cylindrical walls 12a and 12b.

In the invention, the collars 8 are of an outline that is defined in such a manner that while any one of the clamping nuts 6, 7 is being tightened, the collars cannot come to bear against the cylindrical walls 12a and 12b, but do become blocked against one another so as to prevent the pins 5 from turning.

Figure 3:
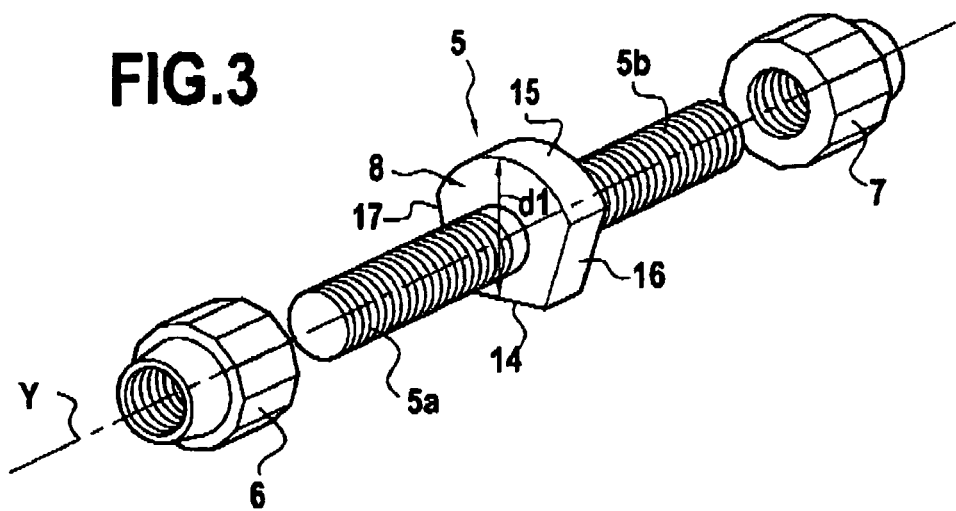
FIG. 3 is a perspective view of a pin in accordance with the invention.

As shown in FIG. 3, each collar 8 presents four faces, namely a radially inside face 14 and a radially outside face 15 which is substantially cylindrical, and spaced apart by a distance d1 that is less than the width $\underline{d}$ of the groove 10, and two plane side faces 16 and 17 which form an angle A between them that is substantially equal to but less than the angular offset B between two adjacent holes 9a, as shown in FIG. 2.

Figure 4:
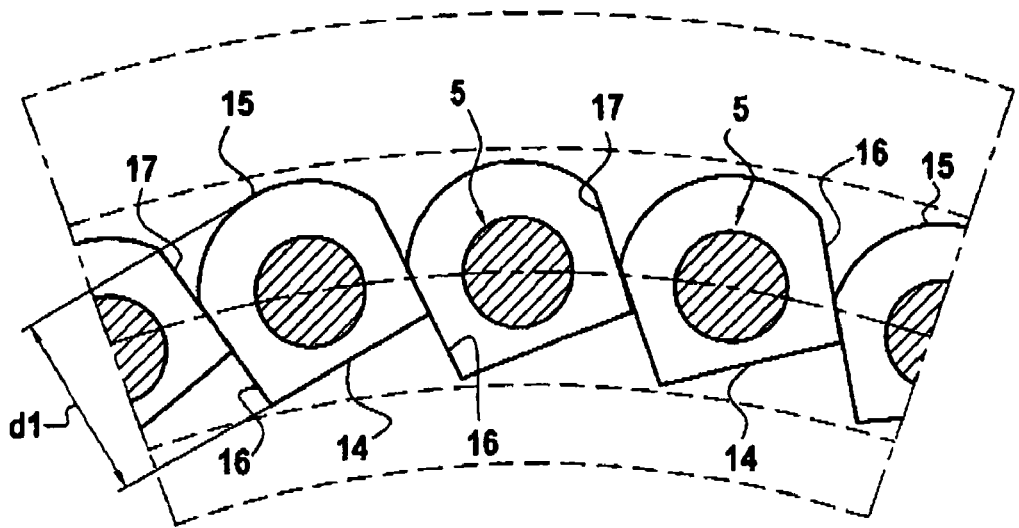
FIG. 4 shows three adjacent pins mutually blocking one another.

The three parts 2, 3, and 4 are assembled together as follows. Initially, the pins 5 are fastened on the part 2 placing the collars 8 side-by-side in the groove 10. The plane side face 16 of a collar 8 and the plane side face 17 of the adjacent collar are thus situated in a common radial plane containing the axis X, and then the nuts 6 are put in place and tightened. Once the collars 8 have turned a little, (as shown in FIG. 4), by an amount associated with the clearance between two pins, the adjacent plane faces 16 and 17 of two adjacent pins thus come to bear against each other and prevent the pins 5 from turning. This plane bearing surface between the pins via their faces 16, 17 enables stresses to be well distributed, thereby increasing the lifetime of the pins. The parts 3 and 4 are then assembled on the ends of the pins 5 that emerge from the face 2a of the part 2, and the nuts 7 are then put into place and tightened.

What is claimed is:

1. A fastener system comprising:
   two parts aligned along a common axis, the two parts comprising flanges with bearing surfaces extending perpendicularly to said common axis, said flanges comprising through holes evenly distributed about the common axis and positioned to be into register with one another,
   a plurality of pins, each pin being inserted in a pair of through holes of the flanges and having threaded ends,
   each pin comprising a collar between said threaded ends of each pin,
   wherein one of said flanges comprises an annular groove, centered on said common axis, for receiving the collar of each pin, the groove comprising two cylindrical walls coaxial with said common axis and radially spaced by a predetermined distance,
   wherein each of the collars comprises two plane side faces which form a first angle (A) that is substantially equal to but less than a second angle (B) formed by lines extending from the common axis to centers of two adjacent through holes of said one flange, and
   wherein each collar is prevented from bearing against the radially spaced cylindrical walls of the groove by two of the collars respectively being on either side of said each collar, and wherein said each collar is blocked by a planar contact area between the plane side faces of said each collar and the plane side faces of said two collars respectively being on either side of said each collar so as to prevent the pins from turning.

2. A system according to claim 1, wherein the two parts are substantially circularly symmetrical about said common axis.

3. A system according to claim 1, wherein the plane side faces of the collars extend in planes containing said axis.

4. A system according to claim 1, further comprising a clamping nut on each of said threaded ends.

5. A system according to claim 4, wherein each of said pins has an axis parallel said common axis.

6. A system according to claim 1, wherein each of said two parts is substantially circularly symmetrical about the common axis and said pins are evenly distributed about said common axis.

7. A system according to claim 1, wherein said collar has four faces including a radially outside face, a radially inside face and said two plane side faces.

8. A system according to claim 7, wherein said radially outside face is substantially cylindrical.

9. A system according to claim 8, wherein said radially inside face is substantially flat.

* * * * *